United States Patent [19]

Ward

[11] Patent Number: 5,413,482

[45] Date of Patent: May 9, 1995

[54] METHOD OF TRAINING AN OPERATOR IN THE USE OF DETECTION APPARATUS

[76] Inventor: David R. Ward, Holly House, Maidenhead Road, Wokingham, Berkshire RG11 5RR, England

[21] Appl. No.: 983,555

[22] PCT Filed: Oct. 8, 1990

[86] PCT No.: PCT/GB90/01542

§ 371 Date: Feb. 8, 1993

§ 102(e) Date: Feb. 8, 1993

[87] PCT Pub. No.: WO92/06458

PCT Pub. Date: Apr. 16, 1992

[51] Int. Cl.⁶ ............................................. F41A 33/00
[52] U.S. Cl. ...................................... 434/11; 434/218; 434/219
[58] Field of Search ........................... 434/11, 218, 219

[56] References Cited

U.S. PATENT DOCUMENTS

| | | |
|---|---|---|
| 2,755,388 | 7/1956 | Weisz . |
| 2,900,740 | 8/1959 | Brault . |
| 3,096,387 | 7/1963 | Braunbeck ............................ 434/218 |
| 3,208,159 | 9/1965 | Filipov ................................. 434/218 |
| 3,363,329 | 1/1968 | Filipov . |
| 4,657,872 | 4/1987 | Cool . |

FOREIGN PATENT DOCUMENTS

| | | |
|---|---|---|
| 969785 | 12/1950 | France . |
| 1472315 | 12/1965 | Germany . |
| 2230126 | 2/1990 | United Kingdom . |

OTHER PUBLICATIONS

A. H. Marshall, "Alpha Field Radiation Survey Trainer," Navy Technical Disclosure Bulletin, vol. 8, No. 2, Dec. 1982.

Primary Examiner—Gene Mancene
Assistant Examiner—Jeffrey A. Smith
Attorney, Agent, or Firm—Browdy and Neimark

[57] ABSTRACT

A method of training an operator in the use of first detection apparatus responsive to a first sensible emission of a hazardous nature, e.g. radio-active or ionizing radiations or toxic gases or vapors from war gases or nerve gases, and involves training the operator in the use of an alternative second detection apparatus responsive to a second sensible emission of a non-hazardous nature. For use in such a training method, there is provided, in combination, a self-contained movable supply of chemical, e.g. gaseous, material that in use provides a second sensible emission, and a detector responsive to the second sensible emissions and providing an indication commensurate with the level of those emissions, the indication being provided in units of the said first sensible emission. The self-contained movable supply may include one or more of: activated carbon, or silica gel, or a molecular sieve, or a nut or bolt, or a particulate material (e.g. a dust or powder), or simulated pebble, or a simulated stone, or a grease, or a sprayed-on liquid. The gaseous material may include ethylene, or butane, or a chlorinated or fluorinated hydrocarbon, e.g. chloroform. The gas detector may include an explosive atmosphere detector, or a sensitive gas lead detector, or a specific gas monitor, or an electron capture detector.

16 Claims, 1 Drawing Sheet

METHOD OF TRAINING AN OPERATOR IN THE USE OF DETECTION APPARATUS

FIELD OF THE INVENTION

This invention relates to training methods and to articles which can be used in such methods. The invention is particularly, but not exclusively, concerned with training personnel in the use of equipment for detecting hazardous emissions, e.g. ionizing (radio-active) radiations, so-called war gases or nerve gases, and poisonous gaseous emissions from toxic chemicals.

BACKGROUND OF THE INVENTION

Sources of uncontrolled release of ionizing radiation in industry, transportation and military operations are a major health concern to those responsible for safety in these areas. A number of instruments are available to detect such radiations, and are suitable for use by the armed forces and by civilian rescue operations. Invariably such instruments detect one or more of the various radiations likely to be encountered and have very great sensitivity, enabling exceedingly low levels of contamination to be detected.

Once a radiation hazard has been detected, operations to remove or control the hazard may be set in motion. If the source of the radiation is a piece of solid metal, it may be placed in a container, and likewise for liquids, following absorption into a solid. However, many sources of contamination will take the form of particulate material, e.g. dust, for instance following a fire in a radiochemical laboratory, or fallout onto a vehicle, e.g. a ship, from a nuclear weapon or other explosion. In such cases, washing by use of sprinkler systems or hoses may be used to decontaminate the building or vehicle, an instrument being used to monitor the progress and efficiency of the washing process.

Clearly, very thorough training in these cleaning and monitoring processes is needed to ensure that safe operating procedures are followed. However, no responsible organization will willingly spread radioactive particles or dust in a training situation, and it is thus not feasible to train operators in the use, in all circumstances, of instrumentation which responds to radiation.

It has already been suggested (e.g. in U.S. Pat. Nos. 4,500,295, 3,636,641, WO 89/08905, GB-A-1,311,615 and GB-A-2,209,235) to provide either an electrical or a magnetic system which will mimic radiation in that it will give a non-radioactive radio-frequency, or ultra-sonic or magnetic 'signal' that can be detected by an alternative instrument. These systems would appear to have two major drawbacks in that each requires an electrical or magnetic source (which will appear out of context in the training area) and neither will respond, by losing its signal, to the usual water-wash procedures that are in reality required to clear up the source of the hazardous pollution, i.e. the radio-active material or other hazardous emissions such as war gases, nerve gases, and toxic gases or vapors emitted from poisonous chemicals.

SUMMARY OF THE INVENTION

According to one aspect, the present invention provides a method of training an operator in the use of first detection apparatus responsive to a first sensible emission, said method being characterised by training said operator in the use of an alternative second detection apparatus responsive to a second sensible emission that is not electrical and not magnetic and not ultra-sonic.

This training method is particularly advantageous where the first said sensible emission is of a hazardous nature, e.g. comprises radio-active or ionizing radiations and/or comprises emitted vapor of a toxic nature from war gases, nerve gases or other poisonous chemicals.

Preferably said method includes the step of depositing a material capable of emitting said second sensible emission.

Advantageously said material permits a diminution of said second sensible emissions when subjected to a liquid diluent or reagent, e.g. water.

According to another aspect of this invention there is provided method of training an operator in the use of first detection apparatus responsive to a first sensible emission, said method being characterized by the step of depositing a material capable of emitting a second sensible emission, and training said operator in the use of an alternative second detection apparatus responsive to said second sensible emission, the said material permitting a diminution of said second sensible emissions when subjected to a liquid diluent or reagent, e.g. water.

Said material may be miscible with the said liquid so as to be washed away therewith or, as is preferred, may be soluble therein.

Advantageously said material is contained in a so-called molecular sieve. The latter may be coated to reduce the rate of said second sensible emissions of said material and, in this case, the coating is preferably soluble in said liquid.

According to yet another aspect of this invention there is provided material for use in a training method according to this invention, said material comprising a porous body having a gas absorbed therein, the evolution rate of said gas from the body being determined by a coating applied upon the surface of said body.

Preferably said coating is water-soluble.

Advantageously said body is a molecular sieve.

In a preferred embodiment, a chemical compound is provided in or on physical support means (such as dust, grease, or the droplets of a liquid spray), this compound being adapted to provide sensible non-hazardous emissions, e.g. a fluorescent compound emitting ultra-violet light (or other electromagnetic radiations in or near to the visible spectrum) or a readily vaporizable or gaseous compound, and a detector is also provided for the non-hazardous emissions, the detector being "calibrated" in units of radiation. For example the compound can liberate a gaseous or vapor phase chemical that is detected by a portable gas chromatograph, IR spectrometer, or other sensor, that is "calibrated" in units of radiation. Such an arrangement can provide that water washing would remove the chemical, thus simulating radioactive dust removal during decontamination operations.

Advantageously the chemical compound is one which provides a volatile liquid or gas and which, over a period of say an hour, may be easily and sensitively detected by a hand-held instrument. The gaseous emissions may result from either a chemical reaction, or by gas release from a cavity or from a solid absorbent of the gas.

Gas generating reactions may be exemplified by compounds such as 2-chloroethyl phosphoric acid and related molecules which generate ethylene. Alternatively one might use organo-silicon compounds which undergo hydrolysis to form hydrochloric acid and a hydrocarbon gas. Other, more complex gas generating systems may require the mixing of several components immediately prior to use, or the application of heat. Such complexities may be too great for acceptable use and it is therefore considered that an arrangement providing for gas release may be commercially preferable.

BRIEF DESCRIPTION OF THE DRAWINGS

Exemplary embodiments of the present invention will now be described in greater detail with reference to the accompanying drawings. In these drawings.

Figure 1:
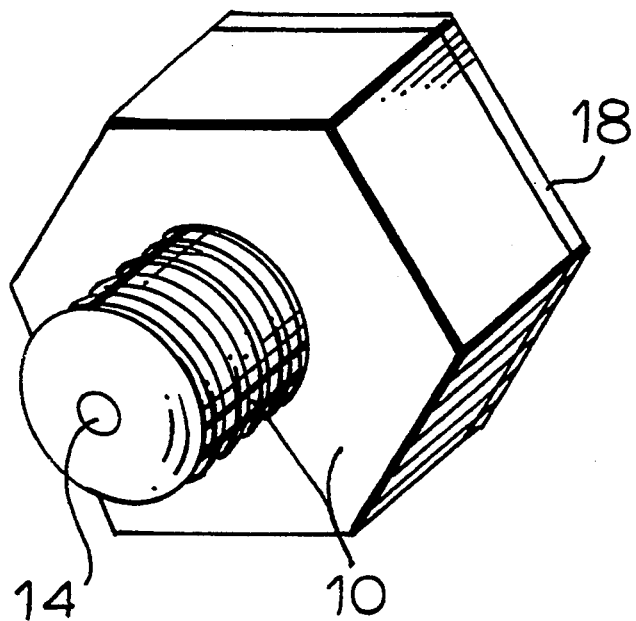
FIGS. 1 and 2 are respectively perspective and longitudinally cross-sectioned views of a cavity device simulating the appearance of a nut or bolt, and for effecting the said gas release.

Detailed Description of Preferred Embodiment(s) of the Invention

The illustrated cavity device 10 may be a unitary (one-piece) molding of plastics material to provide a small chamber 12 containing the gas, e.g. held in an absorbant 15, and connected to atmosphere by a small pore 14. The device 10 may have a magnetic back 18 to secure it in a lifelike position on, for instance, a ship's bulkhead. The pore 14 provides a restricted orifice for the cavity's outlet. This is formed by a plug of a water-soluble wax, such as polyethylene oxide (PEO), that allows the gas to diffuse through, and which is rapidly disintegrated by any washing operation thus to provide a total loss of the simulated "radiation" signal. The plug 14 is thus a soluble mass having a diffusing section.

Many solid materials can be used as an absorbent body 15 within the cavity 12 and to provide the chemically inert, physical support for the gaseous chemical. Typical examples of the solid materials which have the property of absorbing gases are activated carbon, silica gel and molecular sieves. All of these can retain water more strongly than hydrocarbons, and provide for rapid gas dispersal on washing.

The pore size of the material determines the size of molecule that can be hosted, and molecules in size from methane up to $C_{20}$ can be accommodated in various materials. Invariably the gas absorbed is released on release of pressure, with various factors affecting the rate of evolution. The addition of water to any of these absorbants usually results in a very rapid replacement of the gas by water molecules. Although it is considered that any of the above-mentioned absorbants may be suitable, those preferred (because they are available in the most standardized form) are molecular sieves.

Good test results were obtained using a molecular sieve 13X, available from Laporte Industries, with the absorbed gas being at least 99% butane (although gas of such purity may not be needed in commercial practice). At 25° the sieve had a butane capacity of 14 weight % and, in one test, provided complete evolution of gas in about 30 minutes.

To extend the period of evolution of the gas and thus to give a longer useful training period, various coatings were applied to the molecular sieve (optionally in addition to the PEO plug partially blocking the pore). The coating material had suitable permeability and also was soluble in water so as to be rapidly removed by the washing process, thus liberating the gas. A preferred test coating used was polyethylene oxide material supplied by Hythe Chemicals. This was applied as 0.5% and 1.0% coatings on two test molecular sieves, each resulting in an extended performance to about 1 hour.

Figure 2:
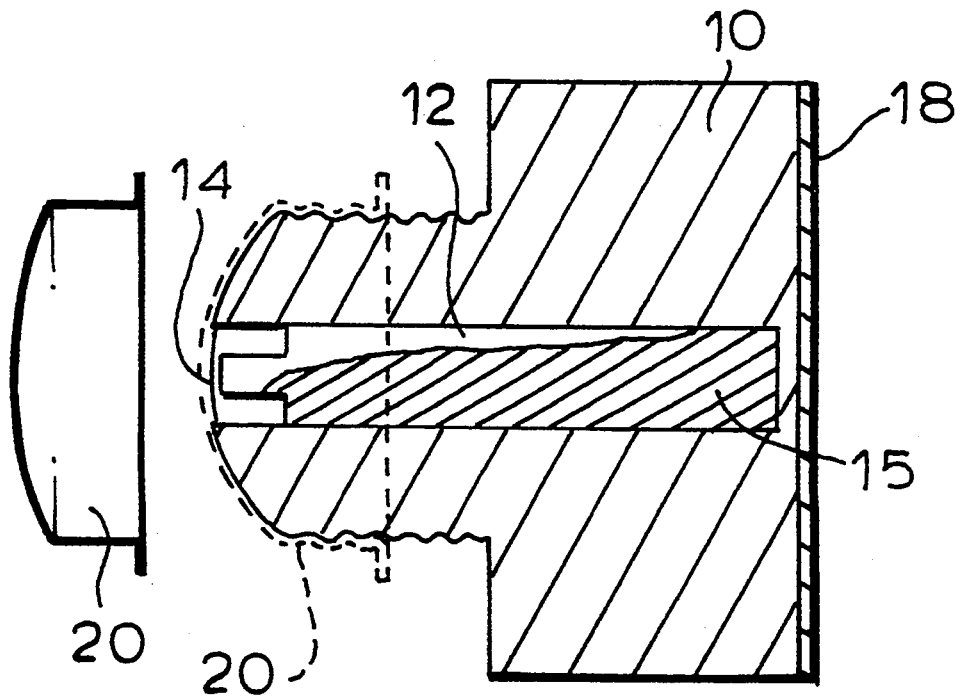

In one alternative arrangement (particularly suitable for outdoor use), the cavity device may have an external shape simulating a pebble or stone rather than the nut illustrated in FIGS. 1 and 2. In another alternative arrangement, the molecular sieve can be supplied as a brown-white powder or sand so that, in use for training in accord with this invention, it can be spread as a 'dust' (in which case it may need to be colored by addition of, say, a black pigment). Alternatively, the powder or sand of the molecular sieve material can be formulated into a pseudo-grease by, say, combining it with similar sized particles of a sticky gel. In such a gel form, it can be smeared on walls, bulkheads, brickwork etc., giving a 'natural' appearance.

A large number of portable analytical systems and instruments are available to detect gases. These fall into three major, potentially suitable, classes, namely: explosive atmosphere monitors, sensitive gas leak detectors, and specific gas monitors.

Explosive atmosphere monitors (the least expensive class) are readily available for the determination of the explosive limits of common gases in air. They are invariably small portable instruments, designed to monitor primarily methane in the 1–5% range. Their sensing systems are based on thermistors, hot wires or pellistors, but most manufacturers are not prepared to guarantee accurate performance below about 1–2000 ppm.

Sensitive gas leak detectors are more expensive but they have the major advantage that they can easily detect hydrocarbons down to 1 ppm. These instruments function on a gas chromatographic principle, and therefore use a flame ionisation detector, with or without a column. They incorporate a small hydrogen cylinder, and are more bulky than the usual explosive atmosphere monitor. Specific gas monitors are the most expensive and several versions are hand held instruments. They can be readily used for the detection of exceedingly low levels of chemical compounds, for instance highly toxic chemcals, war gases and the like.

Tests were performed using a high sensitivity gas leak detector, namely a portable flame ionization detector available from Research Engineers Ltd under the Trade Mark "GAS-TEC". This was used to monitor the emissions, simulating ionizing radiations, emanating from a butane-charged 13X molecular sieve material-firstly uncoated and loaded with butane, and secondly with the molecular sieve coated with 0.5% PEO and also loaded with butane. It should be noted that the "GAS-TEC" pumps in the sampled air at 1.5L/min, in effect gathering up the butane in the area being sampled.

The tests consisted of taking measurements of gas evolution at five points 'A', 'B', 'C', 'D' and 'E' at 1 meter intervals along a line on a carpeted floor, the central point 'C' being occupied by a petri dish. Initially, to obtain a blank reading, each point was monitored in turn by the "GAS-TEC" instrument, and all were found to give values of less than 1 ppm. About 3 g of butane-filled 13X molecular sieve was then poured into the petri dish, and the monitoring repeated at 1, 5, 10, 15 etc. minutes from the start. Only one reading was taken at stations A, B, D and E, if initially found to be zero; while three sequential readings were taken at C. Tables 1 and 2 show the results of this experiment on respectively the uncoated and the coated molecular sieve.

TABLE 1

Gaseous emissions from a 2.99 g uncoated 13x molecular sieve loaded with 10.95% butane, the readings being taken directly from the meter on the "GAS-TEC" instrument.

| Elapsed Time, in Mins | Butane Concentration in ppm Points | | | | |
|---|---|---|---|---|---|
| | A | B | C | D | E |
| 0 | 0 | 0 | 0 | 0 | 0 |
| 1.5 | 0 | 0 | 1500/1500/1500 | 0 | 0 |
| 5 | 0 | 0 | 700/500/700 | 0 | 0 |
| 15 | 0 | 0 | 300/300/350 | 0 | 0 |
| 20 | 0 | 0 | 250/300/280 | 0 | 0 |
| 30 | 0 | 0 | 140/200/240 | 0 | 0 |

TABLE 2

Gaseous emissions from a 2.64 g 13x molecular sieve, coated with 0.5% PEO, and loaded with 6% butane, the readings being taken directly from the meter on the "GAS-TEC" instrument.

| Elapsed Time, in Mins | Butane Concentration in ppm Points | | | | |
|---|---|---|---|---|---|
| | A | B | C | D | E |
| 0 | 0 | 0 | 0 | 0 | 0 |
| 1 | 0 | 0 | 110 | 0 | 0 |
| 5 | 0 | 0 | 200/220/230 | 0 | 0 |
| 10 | 0 | 0 | 250/200/200 | 0 | 0 |
| 15 | 0 | 0 | 180/200/180 | 0 | 0 |
| 20 | 0 | 0 | 120/170/200 | 0 | 0 |
| 25 | 0 | 0 | 130/170/160 | 0 | 0 |
| 45 | 0 | 0 | 80/100/80 | 0 | 0 |
| 60 | 0 | 0 | 80/80/70 | 0 | 0 |

In both cases, the evolved butane was easily detected over the petri dish, and was found to be absent at the four other monitoring stations. Concentrations of up to 1500 ppm were found for the uncoated material, and 250 ppm for the coated. Although the lengths of time of the experiments were different, it would appear that, in line with expectations, the coated material liberated butane at a lower rate, but for a longer overall period, than the uncoated material.

It is considered that a lower cost analyzer may be utilized if the butane concentration can be increased, probably by increasing the sample size (i.e. the molecular sieve) or by utilizing a modified absorbent system.

It is envisaged that commercial training apparatus embodying this invention can be supplied consisting of two components: a supply of source material and a gas detector. The source material can comprise a gas absorbed in a molecular sieve, disguised as dust or grease. It will be packed in, say, 5 g quantities in sealed tubes, which will be opened only at the point of use. Alternatively or additionally, the above-described and illustrated hollow bolt 10, or the above-described simulation of a pebble or stone, may be used on occasion to vary the training scheme. The gas detector can be a commercially available hand-held device, with the readout modified to read in radiation units rather than in gas concentration.

In use, the training supervisor can distribute the source material in the training area by either opening the sealed tube and spreading the contents in a random manner, or by appropriately adhering, e.g. magnetically (via the magnetic rubber backing 18), the simulated hollow bolt 10 to a wall, ceiling, floor or other structure and removing its thin rubber sealing cap 20 (from its sealing position shown by broken lines in FIG. 2) to activate the device 10. The person under instruction can then enter the area, and search for the "radiation" by observing the readout on the gas monitor. Having located it, the trainee can then carry out an appropriate "decontamination" exercise, e.g. by washing or hosing down the area. Re-examination of the area will then demonstrate the effectiveness of the decontamination drill.

It should be noted that the system, as developed, can provide a viable period of about one hour for the above training programme.

It will be apparent that such a training method simulates or mimics the detection of ionizing radiation but is entirely safe to use in training situation. Furthermore it can provide a training period of the order of 1 hour using commercially available gas detection instruments (trivially modified to provide a readout in units of radiation) together with easily prepared materials.

It will be appreciated that the present invention is not limited to the methods of, and articles for use in, training personnel to detect ionising radiation. On the contrary, it is considered that the present invention may be applied to training for the detection of other hazardous emissions, e.g. war gases, nerve gases and poisonous gaseous emissions from toxic chemicals, by utilizing an article to emit a (relatively) non-hazardous gas in simulation of such a hazardous emission.

It will be further appreciated that the present invention is not limited to the embodiments described above and that it can be modified in many respects without departing from the scope of this invention. For example it might be feasible to use a chlorinated hydrocarbon, such as chloroform, instead of butane, and this may well behave in a very similar way in the molecular sieve. Detection could then be by an electron capture detector. This could provide an inherently simple mechanical and electronic system, with the advantage of very great sensitivity (to at least two orders of magnitude better than a flame ionization detector). Use of such a detector could also simplify the chemical part of the apparatus in that absolute loadings of the gas into the molecular sieve might not be as critical. Other modifications will be apparent to those skilled in this art.

I claim:

1. A method of training an operator in the use of first detection apparatus responsive to a first sensible emission, comprising the step of training said operator in the use of an alternative second detection apparatus responsive to a second sensible emission of a gaseous or vaporous nature.

2. A method according to claim 1 wherein said second emission is from a chemical source.

3. A method according to claim 1, further comprising a step of depositing a material capable of emitting said second sensible emission.

4. A method according to claim 3, wherein said material is contained in a molecular sieve.

5. A method according to claim 4, wherein said molecular sieve is coated to reduce the rate of said second sensible emissions of said material.

6. A method according to claim 3, further comprising a step of subjecting said material to a liquid wash, said liquid wash diminishing said second sensible emission of said material.

7. A method according to claim 6, wherein said material is soluble in said liquid wash.

8. A method according to claim 1, wherein said first sensible emission is of a hazardous nature and comprises radio-active or ionizing radiations.

9. A method according to claim 1, wherein said first sensible emission is of a hazardous nature and comprises emitted vapor of a toxic nature selected from a group consisting of war gas, nerve gas, and a poisonous chemical.

10. A method of training an operator in the use of first detection apparatus responsive to a first sensible emission, comprising the steps of:

depositing a material capable of emitting a second sensible emission;

training said operator in the use of an alternative second detection apparatus responsive to said second sensible emission of a gaseous or vaporous nature;

and subjecting said material to a liquid wash, said liquid wash diminishing said second sensible emission of said material.

11. A method according to claim 10, wherein said material is soluble in said liquid wash.

12. A method according to claim 10, wherein said second emission is from a chemical source.

13. A method according to claim 10, wherein said first sensible emission is of a hazardous nature and comprises radio-active or ionizing radiations.

14. A method according to claim 10, wherein said first sensible emission is of a hazardous nature and comprises emitted vapor of a toxic nature selected from a group consisting of war gas, nerve gas, and a poisonous chemical.

15. A method according to claim 10, further comprising a step of washing away said material with said liquid wash.

16. A method according to claim 10, further comprising a step of washing away said material with said liquid wash.

* * * * *